US012572156B2

(12) United States Patent
Zhou et al.

(10) Patent No.: US 12,572,156 B2
(45) Date of Patent: Mar. 10, 2026

(54) SYSTEMS AND METHODS FOR LANDING SITE SELECTION AND FLIGHT PATH PLANNING FOR AN AIRCRAFT USING SOARING WEATHER

(71) Applicant: HONEYWELL INTERNATIONAL INC., Charlotte, NC (US)

(72) Inventors: Bangda Zhou, Shanghai (CN); Shuai Chen, Shanghai (CN); Jianyao Gao, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 121 days.

(21) Appl. No.: 18/663,308

(22) Filed: May 14, 2024

(65) Prior Publication Data

US 2025/0355442 A1 Nov. 20, 2025

(51) Int. Cl.
| | |
|---|---|
| *G05D 1/617* | (2024.01) |
| *B64D 45/00* | (2006.01) |
| *G05D 1/85* | (2024.01) |
| *G05D 109/22* | (2024.01) |

(52) U.S. Cl.
CPC ............. *G05D 1/621* (2024.01); *B64D 45/00* (2013.01); *G05D 1/854* (2024.01); *G05D 2109/22* (2024.01)

(58) Field of Classification Search
None
See application file for complete search history.

(56) References Cited

U.S. PATENT DOCUMENTS

| | | | |
|---|---|---|---|
| 5,398,186 A | 3/1995 | Nakhla | |
| 8,292,234 B2 | 10/2012 | Shuster | |
| 8,543,264 B1 * | 9/2013 | Tomas | G05D 1/106 |
| | | | 701/16 |
| 9,257,048 B1 | 2/2016 | Offer et al. | |
| 10,134,292 B2 | 11/2018 | Kushwaha | |
| 10,242,582 B1 * | 3/2019 | Ogden | G08G 5/21 |
| 11,657,721 B1 | 5/2023 | Suiter et al. | |
| 2003/0060940 A1 | 3/2003 | Humbard et al. | |
| 2011/0264312 A1 | 10/2011 | Spinelli et al. | |
| 2019/0041233 A1 * | 2/2019 | Duerksen | G01C 23/00 |
| 2021/0088356 A1 | 3/2021 | Glomski et al. | |
| 2021/0276728 A1 * | 9/2021 | Mast | G08G 5/55 |
| 2022/0122466 A1 * | 4/2022 | Feyereisen | G08G 5/55 |
| 2022/0198945 A1 | 6/2022 | Rey et al. | |

* cited by examiner

*Primary Examiner* — Abdhesh K Jha
(74) *Attorney, Agent, or Firm* — Ingrassia Fisher & Lorenz LLP

(57) ABSTRACT

Systems and methods are provided for landing site selection and flight path planning for an aircraft using soaring weather conditions. The methods may include, with one or more processors of a controller onboard the aircraft: receiving data indicative of terrain, airports, airspace, aerodynamics of the aircraft, real-time weather, and real-time status of the aircraft, determining a gliding range of the aircraft based at least in part on soaring weather conditions that include environmental regions of thermal draft capable of producing lift sufficient to extend the gliding range of the aircraft, determining a landing site for the aircraft based on the gliding range of the aircraft, and determining a flight path of the aircraft that uses the soaring weather conditions to extend the gliding range of the aircraft and land at the landing site.

20 Claims, 8 Drawing Sheets

500

510

512

524

526

518

520

514

516

10

522

600

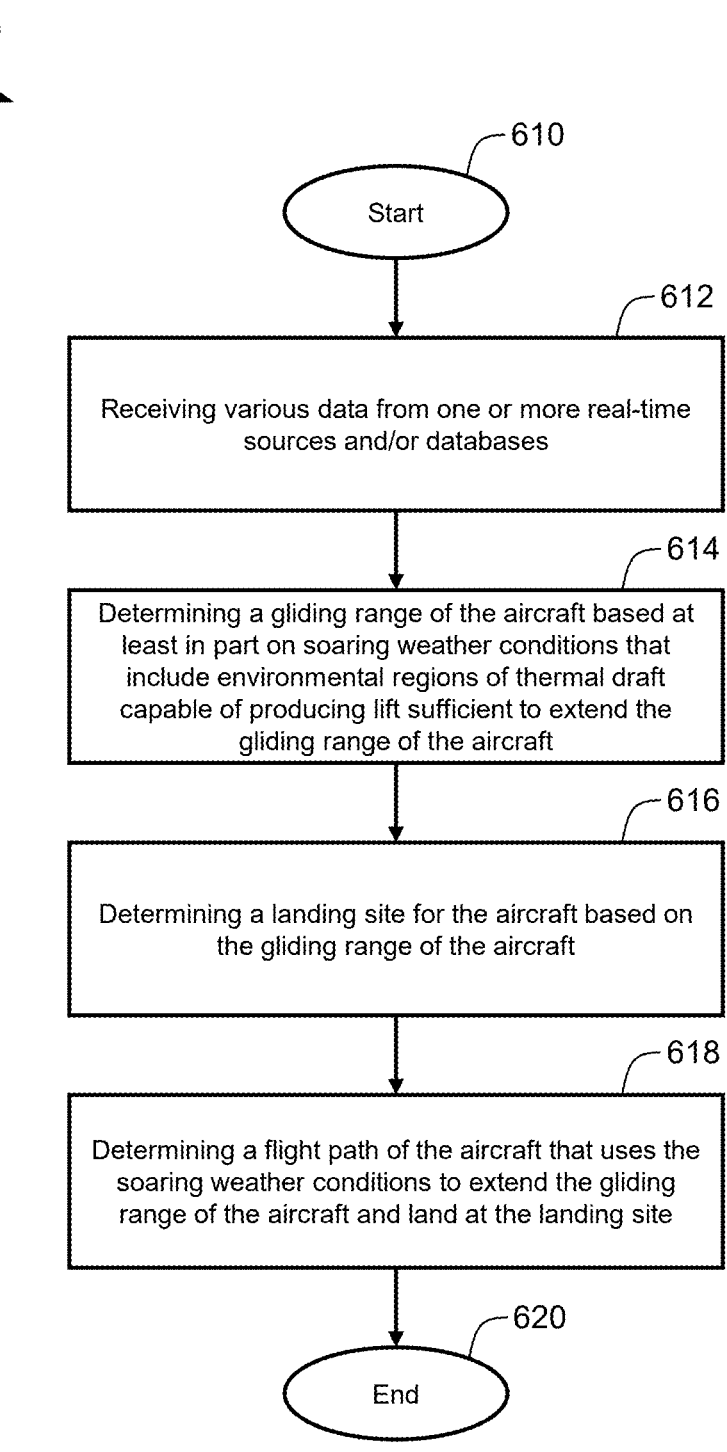

610

Start

612

Receiving various data from one or more real-time sources and/or databases

614

Determining a gliding range of the aircraft based at least in part on soaring weather conditions that include environmental regions of thermal draft capable of producing lift sufficient to extend the gliding range of the aircraft

616

Determining a landing site for the aircraft based on the gliding range of the aircraft

618

Determining a flight path of the aircraft that uses the soaring weather conditions to extend the gliding range of the aircraft and land at the landing site

620

End

SYSTEMS AND METHODS FOR LANDING SITE SELECTION AND FLIGHT PATH PLANNING FOR AN AIRCRAFT USING SOARING WEATHER

TECHNICAL FIELD

The present invention generally relates to aircraft guidance, and more particularly relates to systems and methods for landing site selection and path planning in an unlikely but postulated complete loss of engine thrust event.

BACKGROUND

Modern aircraft typically have one or two propulsion engines. Although unlikely, it is postulated that the propulsion engine of a single-engine aircraft could be compromised and rendered incapable of providing the expected thrust in response to certain events, such as fuel starvation, foreign object ingestion, fuel contamination, fuel freezing, or component failure. Even more unlikely, yet postulated, is a dual engine failure event on a dual engine aircraft (i.e., a complete loss of engine thrust). If such highly unlikely events were to occur, systems within modern aircraft may consider the time remaining for flight as limited to the kinetic energy (speed) and potential energy (altitude) currently stored in the aircraft. Since these two sources of energy are very finite, as compared to the mechanical energy produced by an engine, the time remaining for flight and therefore options available for safe landing of the aircraft may be limited.

Hence, there is a need for a system and method that is capable of automated recommendations, path planning, and/or control of an aircraft to a safe landing site for a controlled landing following a postulated complete loss of engine thrust event. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a method is provided for providing aviation navigational information to a pilot of an aircraft during operation of the aircraft. The method may include, with one or more processors of a controller onboard the aircraft: receiving data indicative of terrain, airports, airspace, aerodynamics of the aircraft, real-time weather, and real-time status of the aircraft, determining a gliding range of the aircraft based at least in part on soaring weather conditions that include environmental regions of thermal draft capable of producing lift sufficient to extend the gliding range of the aircraft, determining a landing site for the aircraft based on the gliding range of the aircraft, and determining a flight path of the aircraft that uses the soaring weather conditions to extend the gliding range of the aircraft and land at the landing site.

In various embodiments, a system is provided for providing aviation navigational information to a pilot of an aircraft during flight of the aircraft. The system may include one or more sources of data indicative of terrain, airports, airspace, aerodynamics of the aircraft, real-time weather, and a real-time status of the aircraft, and a controller onboard the aircraft in operable communication with the one or more sources, the controller configured to, with one or more processors: receive the data from the one or more sources, determine a gliding range of the aircraft based at least in part on soaring weather conditions that include environmental regions of thermal draft capable of producing lift sufficient to extend the gliding range of the aircraft, determine a landing site for the aircraft based on the gliding range of the aircraft, and determine a flight path of the aircraft that uses the soaring weather conditions to extend the gliding range of the aircraft and land at the landing site.

Furthermore, other desirable features and characteristics of the method and system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein:

FIG. 6 is a flowchart illustrating an exemplary first method for landing site selection and path planning for an aircraft with the use of soaring weather in accordance with an embodiment;

DETAILED DESCRIPTION

Figure 1:
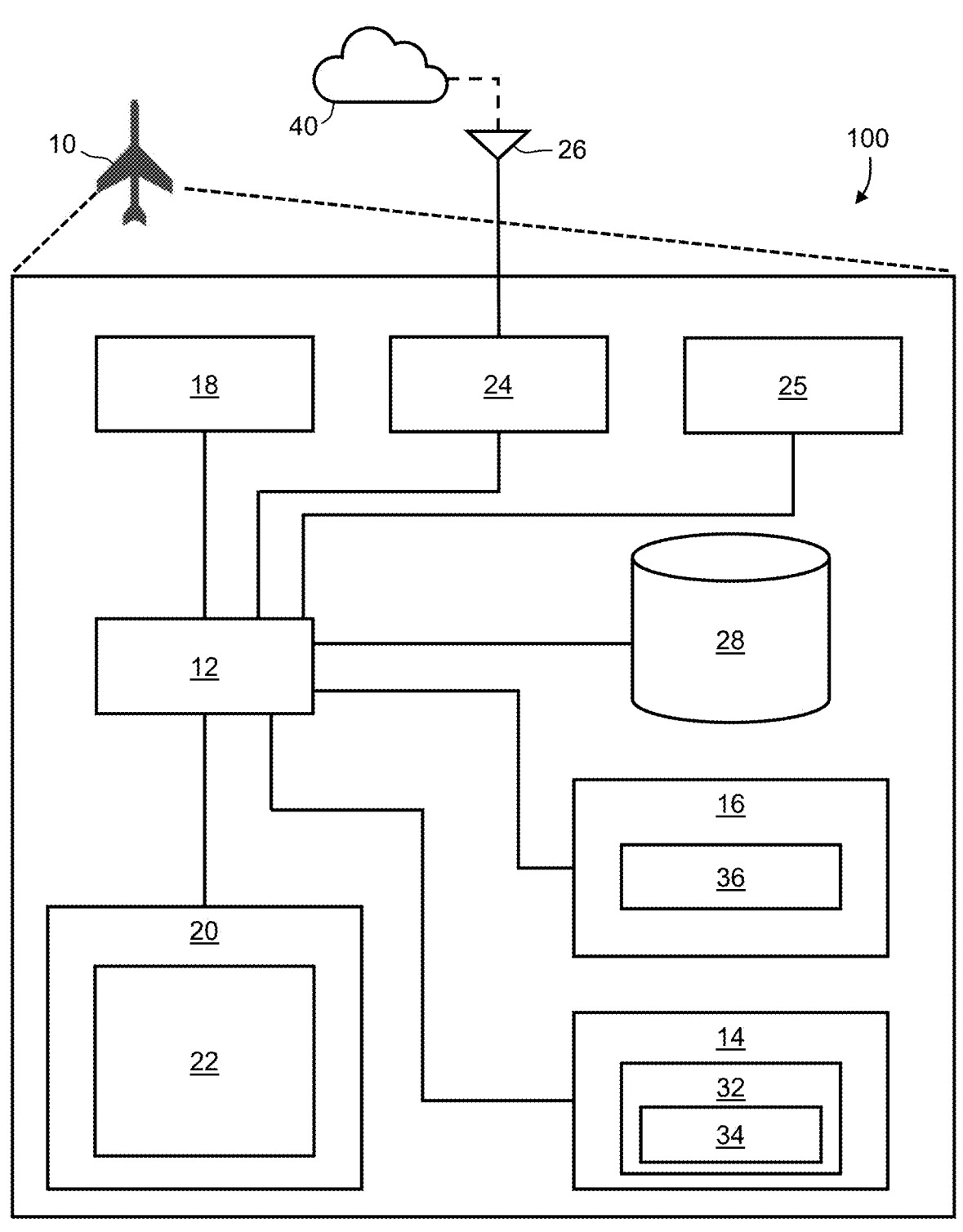
FIG. 1 schematically represents an aircraft and components of a soaring weather system thereof in accordance with an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for landing site selection and path planning in an unlikely, yet postulated, complete loss of engine thrust event in an aircraft during flight. The systems and methods may use various parameters for the landing site selection and path planning such as, but not limited to, aircraft altitude, speed, and position. In addition to these and other parameters, the systems and methods may consider the use of soaring weather conditions to extend the flight of the aircraft.

Soaring weather refers to meteorological conditions that naturally provide lift for flying aircraft. Three elements of soaring weather include thermal activity, wind patterns, and cloud formations. Thermal soaring is the most common type and valuable soaring condition for gliding. The thermal, generally the rising columns of warm air, expands and rises from the ground into the sky, leading to air movement capable of providing lift. Predictions of thermal can look for signs such as cumulus clouds and heat absorbing areas on the ground, such as dark plowed fields, asphalt roads, cityscape, and rocky terrain. The diameter of a typical thermal cross-section may be on the order of about 500 to 1,000 feet. Ridge soaring is formed when the wind encounters the slope of a ridge. The wind is forced to rise, creating an upward airflow along the slope. Predictions of ridge soaring are usually parallel to the ridge at a certain distance, typically on the windward side. Flights of more than 1,000 miles have been made using the ridge lift along mountain chains. Waving soaring is created by the interaction of solid wind with mountainous terrain or other sources of turbulence in the atmosphere. Compared with ridge soaring, wave soaring can generate standing waves on the leeward side of the mountains, creating large regions of rising and sinking air occurring many times in succession. Gliders can rise at 2,000 feet per minute or more in the rising air on the upwind side of each wave. The prediction sign of the wave soaring condition may be the wave-liked cumulus cloud which can also be generated by thermal.

Referring now to FIG. 1, an aircraft 10 and certain systems thereof are illustrated in accordance with an exemplary and nonlimiting embodiment of the present disclosure. It should be noted that the term aircraft, as utilized herein, may include any manned or unmanned object capable of flight and that is capable of gliding. Examples of aircraft may include, but are not limited to, fixed-wing aerial vehicles (e.g., propeller-powered or jet powered), unmanned aerial vehicles (UAVs), delivery drones, etc.

A soaring weather system 100 may be utilized onboard the aircraft 10 as described herein. As schematically depicted in FIG. 1, the system 100 includes and/or is functionally coupled to the following components or subsystems, each of which may assume the form of a single device or multiple interconnected devices, including, but not limited to, a controller 12 operationally coupled to at least one display device 32, which may optionally be part of a larger on-board display system 14, computer-readable storage media or memory 16, an optional user interface 18, onboard data sources 20 including, for example, an array of geospatial and flight parameter sensors 22, a navigation system 25, and a communication system 24 including an antenna 26, which may wirelessly transmit data to and receive data from various external sources 40 physically and/or geographically remote to the system 100 and/or the aircraft 10. The system 100 may be separate from or integrated within a flight management system (FMS) and/or a flight control system (FCS).

Although schematically illustrated in FIG. 1 as a single unit, the individual elements and components of the system 100 can be implemented in a distributed manner utilizing any practical number of physically distinct and operatively interconnected pieces of hardware or equipment. When the system 100 is utilized as described herein, the various components of the system 100 will typically all be located onboard the aircraft 10.

The term "controller," as appearing herein, broadly encompasses those components utilized to carry-out or otherwise support the processing functionalities of the system 100. Accordingly, the controller 12 can encompass or may be associated with any number of individual processors, flight control computers, navigational equipment pieces, computer-readable memories (including or in addition to the memory 16), power supplies, storage devices, interface cards, and other standardized components.

In various embodiments, the controller 12 includes at least one processor, a communication bus, and a computer readable storage device or media. The processor performs the computation and control functions of the controller 12. The processor can be any custom made or commercially available processor, a central processing unit (CPU), a graphics processing unit (GPU), an auxiliary processor among several processors associated with the controller 12, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12. The bus serves to transmit programs, data, status and other information or signals between the various components of the aircraft 10. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the sensors 22, perform logic, calculations, methods and/or algorithms, and generate data based on the logic, calculations, methods, and/or algorithms.

Although only one controller 12 is shown in FIG. 1, embodiments of the aircraft 10 can include any number of controllers 12 that communicate over any suitable communication medium or a combination of communication mediums and that cooperate to process the sensor signals, perform logic, calculations, methods, and/or algorithms, and generate data. In various embodiments, the controller 12 includes or cooperates with at least one firmware and software program (generally, computer-readable instructions that embody an algorithm) for carrying-out the various process tasks, calculations, and control/display functions described herein. During operation, the controller 12 may be programmed with and execute at least one firmware or software program, for example, a program 36, that embodies one or more algorithms, to thereby perform the various process steps, tasks, calculations, and control/display functions described herein.

The controller 12 may exchange data with the one or more external sources 40 to support operation of the system 100 in various embodiments. In this case, bidirectional wireless data exchange may occur via the communication system 24 over a communications network, such as a public or private network implemented in accordance with Transmission Control Protocol/Internet Protocol architectures or other conventional protocol standards. Encryption and mutual authentication techniques may be applied, as appropriate, to ensure data security.

In various embodiments, the communication system 24 is configured to support instantaneous (i.e., real time or current) communications between onboard systems, the controller 12, and the one or more external sources 40. The communication system 24 may incorporate one or more transmitters, receivers, and the supporting communications hardware and software required for components of the system 100 to communicate as described herein. In various embodiments, the communication system 24 may have additional communications not directly relied upon herein, such as bidirectional pilot-to-ATC (air traffic control) communications via a datalink, and any other suitable radio communication system that supports communications between the aircraft 10 and various external source(s).

The memory 16 can encompass any number and type of storage media suitable for storing computer-readable code or instructions, such as the program 36, as well as other data generally supporting the operation of the system 100. As can be appreciated, the memory 16 may be part of the controller 12, separate from the controller 12, or part of the controller 12 and part of a separate system. The memory 16 can be any suitable type of storage apparatus, including various different types of direct access storage and/or other memory devices.

A source of information suitable for operating one or more systems of the aircraft 10 may be part of the system 100. In certain embodiments, the source is one or more databases 28 employed to receive and store map data, which may be updated on a periodic or iterative basis to ensure data timeliness. In various embodiments, the map data may include various terrain and manmade object locations and elevations and may be stored in the memory 16 or in the one or more databases 28, and referenced by the program 36. In various embodiments, these databases 28 may be available online and accessible remotely by a suitable wireless communication system, such as the communication system 24.

The sensors 22 supplies various types of data and/or measurements to the controller 12. In various examples, the sensors 22 are configured to sense observable conditions of the exterior environment, the interior environment, and/or a status or condition of a corresponding component of the aircraft 10. In various embodiments, the sensors 22 supply, without limitation, one or more of: inertial reference system measurements providing a location, Flight Path Angle (FPA) measurements, airspeed data, groundspeed data, vertical speed data, vertical acceleration data, altitude data, attitude data including pitch and roll measurements, yaw data, data related to ownship weight, time/date information, heading information, data related to atmospheric conditions, flight path data, flight track data, radar altitude data, geometric altitude data, wind speed and direction data. Further, in certain embodiments of the system 100, the controller 12, and the other components of the system 100 may be included within or cooperate with any number and type of systems commonly deployed onboard aircraft including, for example, an FMS, an Attitude Heading Reference System (AHRS), an Instrument Landing System (ILS), and/or an Inertial Reference System (IRS).

With continued reference to FIG. 1, the display device 32 can include any number and type of image generating devices on which one or more avionic displays 34 may be produced. In various embodiments, the display device 32 may be affixed to the static structure of the aircraft 10 cockpit as, for example, a Head Down Display (HDD) or Head Up Display (HUD) unit. Alternatively, the display device 32 may assume the form of a movable display device (e.g., a pilot-worn display device) or a portable display device, such as an Electronic Flight Bag (EFB), a laptop, or a tablet computer carried into the aircraft 10 cockpit by a pilot.

At least one avionic display 34 may be generated on display device 32 during operation of the system 100. The term "avionic display" as used herein is synonymous with the terms "aircraft-related display" and "cockpit display" and encompasses displays generated in textual, graphical, cartographical, and other formats. The system 100 can generate various types of lateral and vertical avionic displays 34 on which symbology, text annunciations, and other graphics pertaining to flight planning are presented for a pilot to view. The display device 32 is configured to continuously render at least one avionic display 34 showing a terrain environment at a current location of the aircraft 10. The avionic display 34 generated and controlled by the system 100 can include alphanumerical input displays of the type commonly presented on the screens of multi-function control and display units (MCDUs), as well as Control Display Units (CDUs) generally. Specifically, certain embodiments of the avionic displays 34 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface, such as a touch screen display, may be implemented as an integration of the user interface 18 and the display device 32. Via various display and graphics systems processes, the controller 12 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

The navigation system 25 can provide navigation data associated with the aircraft's current position and flight direction (e.g., heading, course, track, etc.) to the controller 12. As such, the navigation system 25 can include, for example, an inertial navigation system, a satellite navigation system (e.g., Global Positioning System) receiver, VLF/OMEGA, Loran C, VOR/DME, DME/DME, IRS, aircraft attitude sensors, or the navigation information can come from a flight management system. The navigation data provided to the controller 12 can also include information about the aircraft's airspeed, ground speed, altitude (e.g., relative to sea level), pitch, and other important flight information. In any event, for this example embodiment, the navigation system 25 can include any suitable position and direction determination devices that are capable of providing the controller 12 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.).

Figure 2:
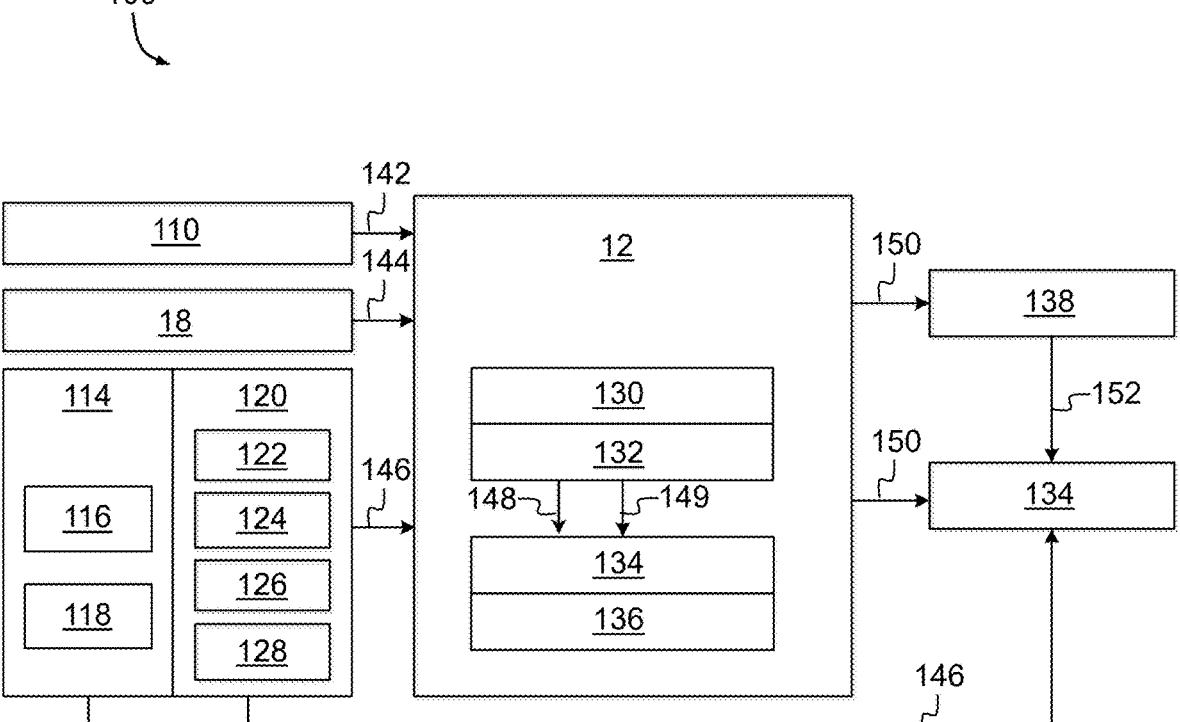
FIG. 2 is a dataflow diagram illustrating operation of the soaring weather system of FIG. 1 in accordance with an embodiment.

With reference to FIG. 2 and with continued reference to FIG. 1, a dataflow diagram illustrates elements of the system 100 of FIG. 1 in accordance with various embodiments. As can be appreciated, various embodiments of the system 100 according to the present disclosure may include any number of modules embedded within the controller 12 which may be combined and/or further partitioned to similarly implement systems and methods described herein. Furthermore, inputs to the system 100 may be received from other control modules (not shown) associated with the aircraft 10, and/or determined/modeled by other sub-modules (not shown) within the controller 12. Furthermore, the inputs might also be subjected to preprocessing, such as sub-sampling, noise-reduction, normalization, feature-extraction, missing data reduction, and the like. In various embodiments, the system 100 includes a soaring weather module 130, an glide performance module 132, a path planning module 134, and a landing site selection module 136.

In various embodiments, the soaring weather module 130 and the glide performance module 132 both receive as input soaring weather forecast data received from a soaring weather data source, such as the database 28 or one of the external sources 40. The soaring weather forecast data includes various data indicating, for example, current and future (e.g., 1 to 2 days) soaring weather forecasts in regions related to a planned flight of the aircraft 10. As a nonlimiting example, soaring weather forecasts are available from the National Oceanic and Atmospheric Administration (NOAA).

In various embodiments, the soaring weather module 130 and the glide performance module 132 both receives as input user command data 144 generated by the user interface 18. The user command data 144 may include various data indicating one or more commands input by a user, such as a pilot of the aircraft 10. The commands may include, for example, instructions to initiate one or more of the modules 130, 132, 134, and 136, or select a recommendation of one or more of the modules 130, 132, 134, and 136.

In various embodiments, the soaring weather module 130 and the glide performance module 132 both receive as input parameter data 146 generated and/or retrieved from various sources, such as real-time data sources 114 including, for example, a weather data source 116 and aircraft data sources 118, and databases 120 including, for example, a terrain database 122, an airport database 124, an airspace database 126, and an aircraft aerodynamics database 128. The real-time data sources 114 may include, for example, one or more of the sensors 22 and/or one or more of the external sources 40. The databases 120 may include, for example, one or more of the databases 28 and/or one or more of the external sources 40. The parameter data 146 may include various data indicating information relating to, for example, weather forecasts along a flight of the aircraft 10 (e.g., temperature, wind speed, direction, cloud imagery, air pressure, etc.), aircraft status during the flight of the aircraft 10 (e.g., speed, altitude, location, attitude, etc.), terrain information along the flight of the aircraft 10 (e.g., topography, elevation, slope angles, land cover classification, and obstacle information, etc.), airport information along the flight of the aircraft 10 (e.g., location, runway configurations, available navigational aids, communication frequencies, and operational characteristics, etc.), airspace information along the flight of the aircraft 10 (e.g., route, altitude restrictions, navigation aids, and communication frequencies), and aerodynamic information of the aircraft 10 (e.g., wingspan, wing area, weight, fuselage measurements, empennage measurements, etc.).

The soaring weather module 130 processes the soaring weather forecast data 142, the user command data 144, if available, and/or the parameter data 146 and generates or extracts soaring weather information, such as the soaring-index (i.e., a measure of lift caused by convective clouds), maximum rate of lift, and potential height of the soaring weather conditions. In some examples, if the soaring weather forecast data 142 is not available, the soaring weather module 130 may predict the soaring weather information by analyzing real-time weather conditions and terrain information. The soaring weather module 130 generates soaring weather data 148 that includes various data indicating the soaring weather information and/or conditions.

The glide performance module 132 processes the parameter data 146 and determines a glide performance of the aircraft 10, that is, the ability of the aircraft 10 to maintain horizontal distance and altitude while descending without engine power. The glide performance is a measurement of how efficiently the aircraft 10 can convert potential energy (altitude) into kinetic energy (speed) to achieve the longest potential glide distance. Parameters that affect glide performance include glide ratio, lift-to-drag ratio, wing area, wingspan, aircraft configuration, and weight. In order to promote efficient conversion of potential energy (altitude) into the forward distance, the best glide speed is typically provided for an aircraft by the manufacturer. However, the provided best glide speed is not necessarily accurate in view of current conditions. Therefore, the glide performance generated by the glide performance module 132 may include a modeled best glide speed and glide range prediction. The glide performance module 132 generates glide performance data 149 that includes various data indicating the glide performance of the aircraft 10, such as the modeled best glide speed and the glide range prediction.

The landing site selection module 136 receives as input the soaring weather data 148 generated by the soaring weather module 130 and receives as input the glide performance data 149 generated by the glide performance module 132. The landing site selection module 136 processes the soaring weather data 148 and the glide performance data 149 to determine one or more potential landing sites for the aircraft 10. The potential landing sites may be determined based on several factors, such as the current aircraft status, altitude, speed, glide range prediction, nearby airports, and soaring weather conditions. The landing site selection module 136 may considered paths to the landing sites including direct paths as well as paths which fly across the identified soaring weather to gain altitude. The landing site selection module 136 may determine costs and gains for each of the considered paths to determine a recommended path to the landing site. In various embodiments, the landing site may be an airport or an off-airport landing site (i.e., not an airport).

In various examples, the landing site selection module 136 may determine an original glide distance (OGD) based on the current altitude and the glide ratio of the aircraft 10. The OGD may be displayed (e.g., on the display 34) as a circle with an icon of the aircraft 10 at the center thereof, wherein the radius of the circle is the OGD. In various examples, the landing site selection module 136 may determine a processed glide distance (PGD) indicative of the glide distance of the aircraft 10 that takes into consideration decreases in energy for potential maneuvers, such as turning. The PGD may be displayed (e.g., on the display 34) as an ellipse with the icon of the aircraft 10 therein, wherein the dimension from the icon of the aircraft 10 to the circumference of the ellipse is the PGD. In general, the dimension from the icon of the aircraft 10 to the circumference of the ellipse is larger in the direction of the aircraft 10 heading, and the smaller in the opposite direction of the heading.

Figure 3:
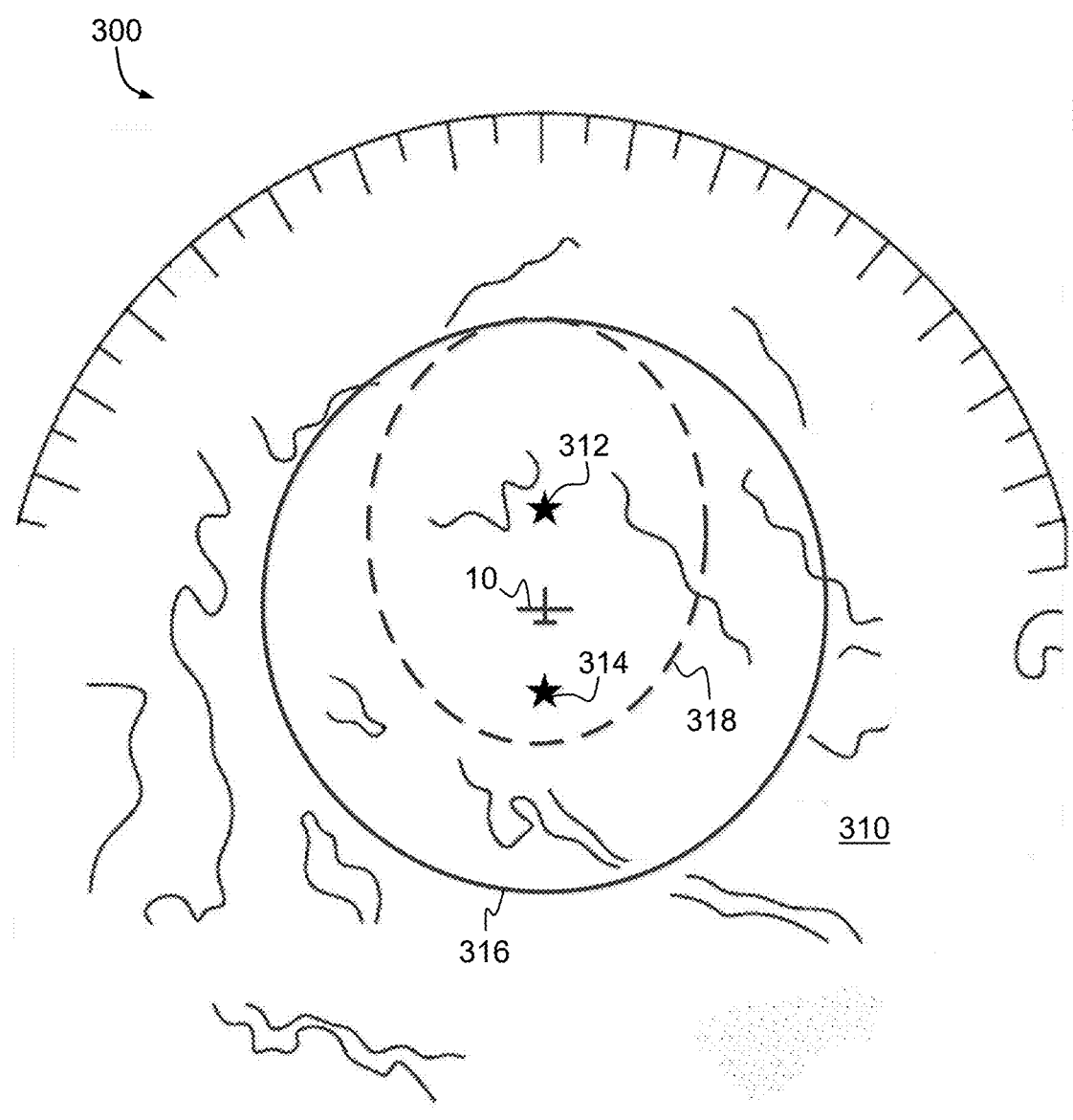
FIG. 3 schematically represents a first display onboard the aircraft of FIG. 1 in accordance with an embodiment.

As an example, FIG. 3 illustrates a display 300 that shows a top-down view of the aircraft 10, terrain 310 adjacent to the aircraft 10, first and second airports 312 and 314, an OGD circle 316 representing the OGD, and a PGD ellipse 318 representing the PGD. As represented, the OGD circle 316 and the PGD ellipse 318 may be significantly different depending on the direction from the heading of the aircraft 10. For example, if the aircraft 10 turns 180 degrees, this maneuver reduces the energy of the aircraft 10 and therefore decreases the energy available to glide. The differential of the OGD and the PGD depends on the performance of the aircraft 10.

In various examples, the landing site selection module 136 may determine a nearest airport based on the PGD. For example, in FIG. 3 the aircraft 10 is located the same distance geographically from each of the first and second airports 312 and 314. However, the first airport 312 is located directly along the heading of the aircraft 10, whereas the second airport 314 is located 180 degrees opposite from the heading. In this situation, the first airport 312 is considered to be the nearest airport as more energy is needed to reach the second airport 314.

In various examples, the landing site selection module 136 may determine an emergency decision height (EDH) indicative of an altitude limitation at which point the selection of the landing site must be complete. That is, above the EDH the landing site selection may be changed and below the EDH the landing site selection cannot be changed. This is similar in concept to the V1 speed during take-off, wherein after the aircraft reaches the V1 speed, the pilot cannot abort take-off. In some examples, the system 100 may lock the landing site selection when the aircraft 10 descends to the EDH.

In various examples, the landing site selection module 136 may determine an emergency decision distance (EDD) which converts the difference between current altitude of the aircraft 10 and the EDH into a lateral distance. This lateral distance represents a maximum range the aircraft 10 can fly without a landing site selection. That is, prior to reaching the EDD the landing site selection may be changed and once the EDH has been reached the landing site selection cannot be changed. In some examples, the system 100 may lock the landing site selection when the aircraft 10 reaches the EDD. The EDH and the EDD may be based on the performance of the aircraft 10, such as the glide ratio, drag-to-life ratio, etc. These limitations are intended to reserve enough altitude and time for pilots to focus on controlling the aircraft 10 when the aircraft 10 is close to the ground.

The landing site selection module 136 generates landing site data that includes various data indicating a recommended landing site and/or a selected landing site.

The path planning module 134 receives as input the soaring weather data 148 generated by the soaring weather module 130, receives as input the glide performance data 149 generated by the glide performance module 132, and/or receives as input the landing site data generated by the landing site selection module 136. The path planning module 134 processes the soaring weather data 148, the glide performance data 149, and/or the landing site data to generate a flight plan to the recommended or selected landing site.

If the aircraft 10 is capable of landing at an airport without the use of soaring weather conditions, the path planning module 134 may generate a direct-to-landing site flight path. If the aircraft 10 is not capable of safely landing at an airport without the use of soaring weather conditions, the path planning module 134 may generate a soaring weather flight path, such as a fly-by flight path, fly-over flight path, or a hold-to-fix flight path. The fly-by and fly-over flight paths include a flight path that passes through soaring weather conditions on the way to the selected landing site. The fly-by and fly-over flight paths may be preferred if the difference between an airport-aircraft angle and aircraft-soaring weather angle is smaller than about 15 degrees. The hold-to-fix flight path includes a flight path that temporarily maintains the aircraft 10 within the soaring weather conditions for a period of time to gain more altitude.

Figure 4:
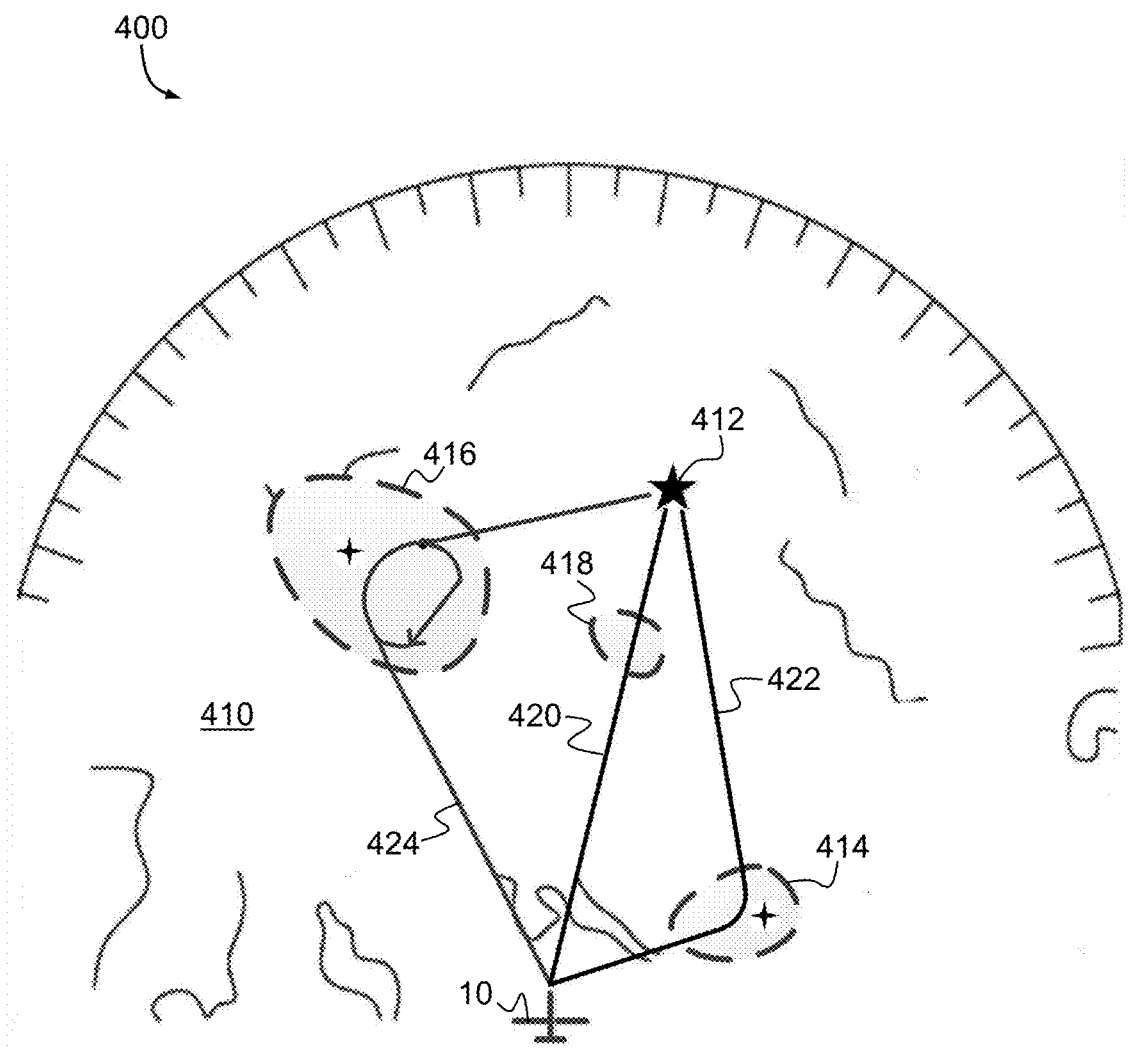
FIG. 4 schematically represents a second display onboard the aircraft of FIG. 1 in accordance with an embodiment.

As an example, FIG. 4 illustrates a display 400 that shows a top-down view of the aircraft 10, terrain 410 adjacent to the aircraft 10, an airport 412, first, second, and third regions of soaring weather 414, 416, and 418, and first, second, and third flight paths 420, 422, and 424. As represented, the first flight path 420 is a direct-to-landing site flight path that leads the aircraft 10 directly to the airport 412. The first flight path 420 may also be considered a fly-over flight path since it passes through the third soaring weather region 418. The second flight path 422 is a fly-by flight path that leads the aircraft 10 through the first soaring weather region 414 and then to the airport 412. The third flight path 424 is a hold-to-fix flight path that leads the aircraft 10 to the second soaring weather region 416, maintains the aircraft 10 within the second soaring weather region 416 by flying in a loop for a period of time, and then to the airport 412.

In various examples, the path planning module 134 may determine a potential lift height (PLH) indicative of the potential altitude gain for the aircraft 10 due to the soaring weather conditions. The PLH may be estimated based on the maximum rate of lift and soaring weather range included in the soaring weather forecast. For example, the PLH may be equal to the maximum rate of lift multiplied by an estimated time in the soaring weather conditions. The estimated time may be determined based on the glide speed and flight plan.

Figure 5:
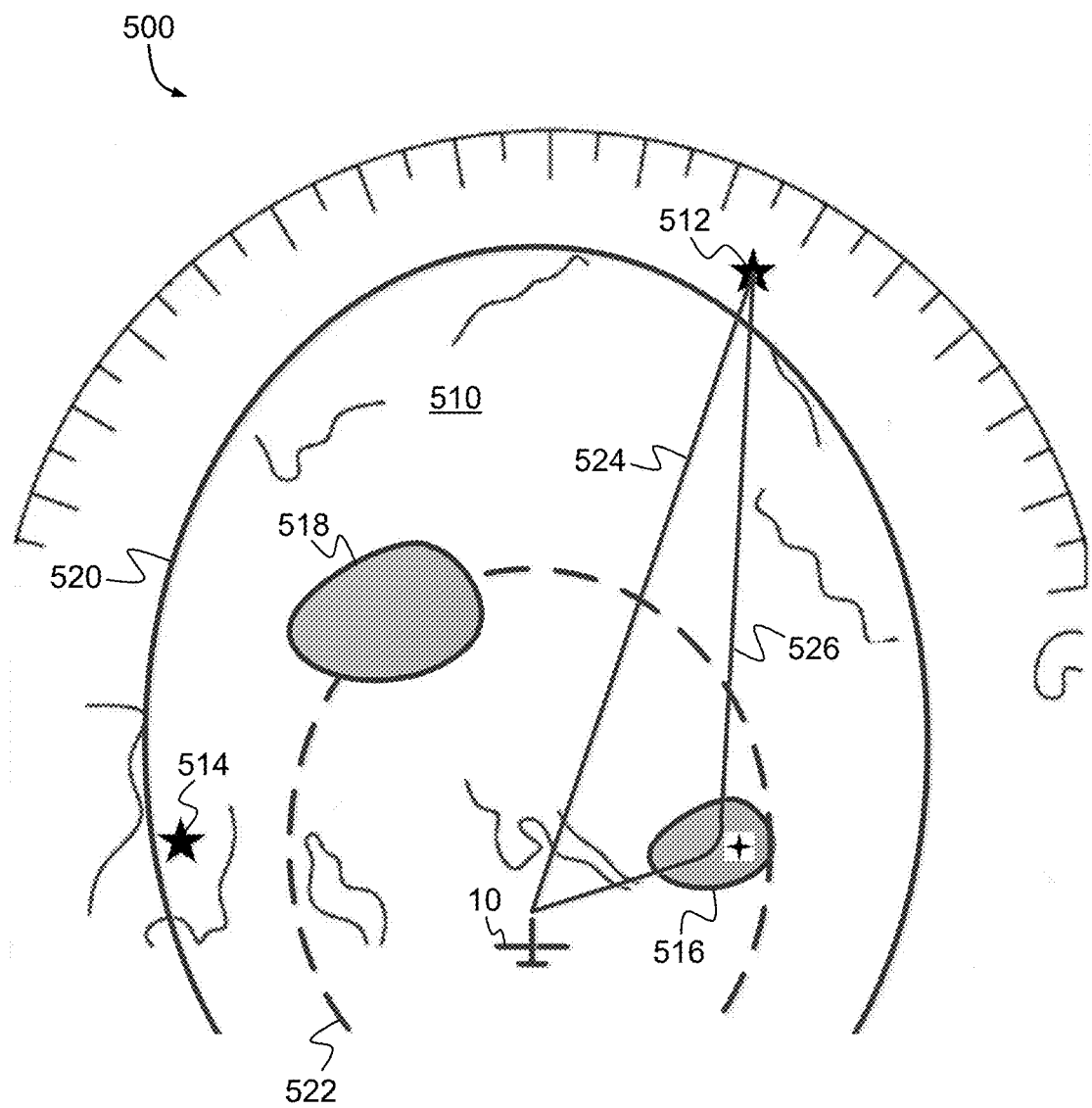
FIG. 5 schematically represents a third display onboard the aircraft of FIG. 1 in accordance with an embodiment.

As an example, FIG. 5 illustrates a display 500 that shows a top-down view of the aircraft 10, terrain 510 adjacent to the aircraft 10, first and second airports 512 and 514, first and second regions of soaring weather 516 and 518, an OGD circle 520 representing the OGD, and a PGD ellipse 522 representing the PGD, and first and second flight paths 524 and 526. In this example, the soaring weather forecast may provide a strength of the first soaring weather region 516 (e.g., thermal) as 900 ft/min, with a range of 1000 ft. If the aircraft 10 flies through the first soaring weather region 516 for 30 seconds, it may gain, for example, about 450 ft of altitude.

In various examples, the path planning module 134 may determine a gap height (GH) indicative of a value which converts the glide distance gap into a height value. If the GH is positive, the aircraft 10 can reach the selected landing site. If the GH is negative (representative of an additional altitude needed to land the aircraft 10 at the landing site), the aircraft 10 cannot reach the selected landing site. The GH may promote the convenience of comparing the available flight paths.

The path planning module 134 generates path planning data that includes various data indicating a recommended flight plan and/or a selected flight plan.

The landing site selection module 136 and the path planning module 134 generate path/site data 150 that includes various data indicating output of the landing site selection module 136 and the path planning module 134, such as the information included in the landing site data and the path planning data. The landing site selection module 136 and the path planning module 134 may transmit the path/site data 150 to a flight director 138 and the display system 14.

The flight director 138 may integrate data from various sources, such as the navigation system 25, the sensors 22, and the path/site data 150 and generate and display guidance cues to assist in maintaining desired flight paths, altitudes, and speeds for the pilots. The flight director 138 promotes the ability of the pilots to maintain precise control and execute smooth maneuvers while flying in the soaring weather conditions.

The display system 14 may provide various flight information to the pilots, including the information derived from the path/site data 150. In some examples, the best glide speed may be set and displayed as the Target Airspeed on the display 34 (e.g., the Primary Flight Display (PFD)). In some examples, the EDH may be set and displayed on the display 34 (e.g., the PFD at the Altitude Indicator area). In some examples, a soaring weather indicator could be set when vertical speed is positive. In some examples, the flight director may be displayed based on the flight plan and current aircraft status on the display 34 (e.g., the PFD). In some examples, the PGD and EDD may be set and displayed on the display 34 (e.g., the Navigation Display (ND)). In some examples, the airports within the PGD could be displayed on the display 34 (e.g., the ND), optionally, with the nearest airport highlighted. In some examples, the soaring weather forecast and/or data extracted or derived therefrom may be set and displayed on the display 34 (e.g., the ND). In some examples, the generated flight path may be displayed on the display 34 (e.g., the ND).

The systems disclosed herein, including the system 100, provide for methods of landing site selection and path planning for an aircraft with the use of soaring weather. For example, FIG. 6 is a flowchart illustrating an exemplary method 600. The method 600 may start at 610. In some examples, the method 600 may initiate automatically in response to certain criteria. For example, the method 600 may include automatically monitoring the status of one or more engines of the aircraft and a status of fuel onboard the aircraft. The method 600 may include alerting the pilot and/or automatically initiating the method 600 in response to detecting issues with the engine(s) (e.g., loss of thrust) and/or remaining fuel decreasing below a predetermined threshold. In some examples, the method 600 may initiate in response to a command by a user, such as a pilot.

At 612, the method 600 may include receiving various data from one or more real-time sources and/or databases including, for example, data indicative of terrain, airports, airspace, aircraft aerodynamics, real-time weather, and real-time aircraft status.

At 614, the method 600 may include determining a gliding range of the aircraft based at least in part on soaring weather conditions that include environmental regions of thermal draft capable of producing lift sufficient to extend the gliding range of the aircraft.

At 616, the method 600 may include determining a landing site for the aircraft based on the gliding range of the aircraft. At 618, the method 600 may include determining a flight path of the aircraft that uses the soaring weather conditions to extend the gliding range of the aircraft and land at the landing site. The method 600 may end at 620. In some examples, the method 600 may end when the aircraft lands.

In some examples, the method 600 may include, after determining the flight path of the aircraft, dynamically monitoring a status of the aircraft and environmental conditions to determine an updated gliding range of the aircraft, and adjusting the landing site to an updated landing site in response to a determination that the gliding range is insufficient to land at the landing site. For example, while following a recommended flight plan, unexpected turbulence may change the status of the aircraft. In such example, the method 600 may include continuously monitoring the aircraft status in case the updated status is no longer sufficient to land the aircraft at the landing site. If the updated landing site is required, the site selection and path planning functions can be triggered again to determine and select a new landing site and generate a new flight plan based on the new status of the aircraft.

Figure 7:
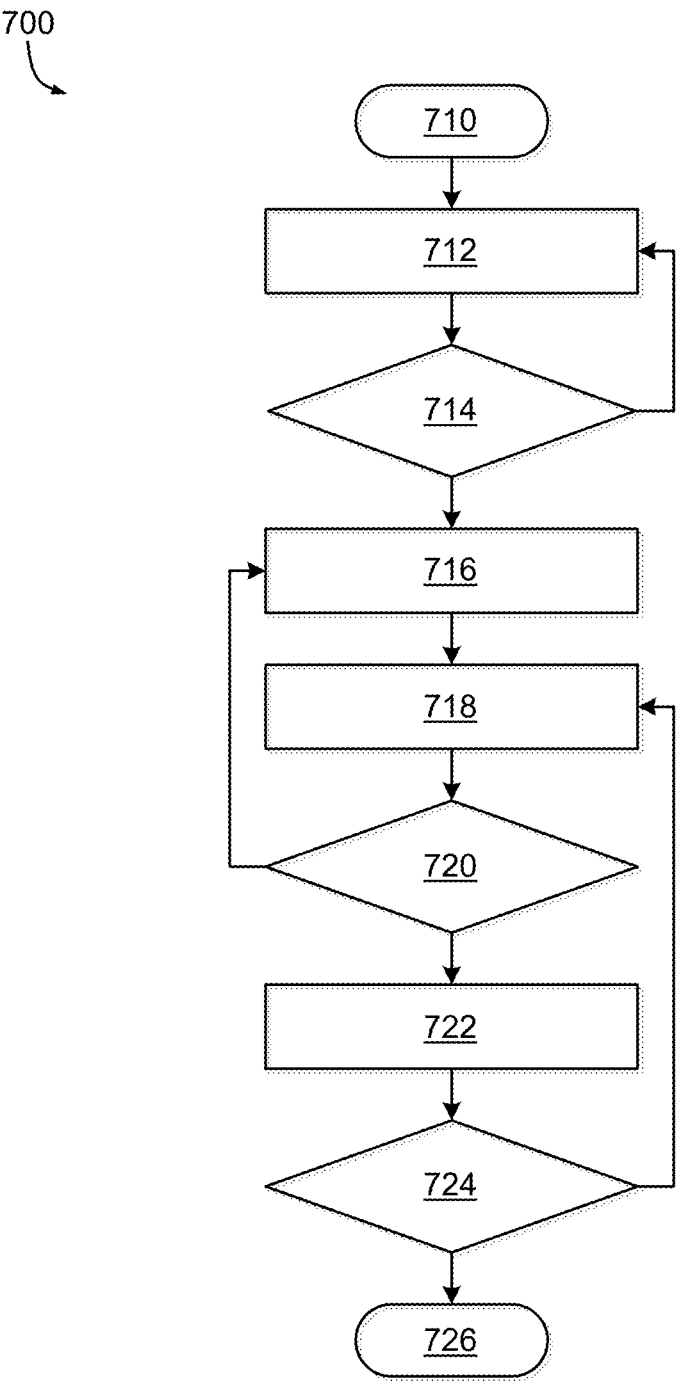
FIG. 7 is a flowchart illustrating an exemplary second method for initiating and ceasing a flight plan for an aircraft in response to compromised engine thrust that, in some examples, may be performed independently or in combination with the first method of FIG. 6, in accordance with an embodiment.

As a nonlimiting example, FIG. 7 is a flowchart illustrating a method 700 for initiating and ceasing a flight plan for an aircraft in response to compromised engine thrust. The method 700 may start at 710. At 712, the method 700 may include monitoring the engine and fuel status of the aircraft. At 714, the method 700 may include determining whether a complete loss of thrust has been detected for the engine. If a loss of thrust has not been detected at 714, the method 700 may include continuing to monitor the engine and fuel status at 712. If a loss of thrust has been detected at 714, the method 700 may include, at 716, selecting a landing site and generating a flight plan thereto with a soaring weather system (e.g., the system 100). At 718, the method 700 may include monitoring the status of the aircraft. At 720, the method 700 may include determining whether the aircraft is capable of landing at the selected landing site. If a determination is made at 720 that the aircraft can no longer land at the selected landing site due to a change in the status of the aircraft, the method 700 may include returning to 716 to select a new landing site and a new flight plan thereto. If the aircraft is still able to land at the selected landing site at 720, the method 700 may include continuing to fly the aircraft on the current flight plan. At 724, the method 700 may include determining whether the aircraft has landed. If the aircraft has not landed yet at 724, the method 700 may return to 718 to continue monitoring the status of the aircraft.

If the aircraft has landed at 724, the method 700 may end at 726.

Figure 8:
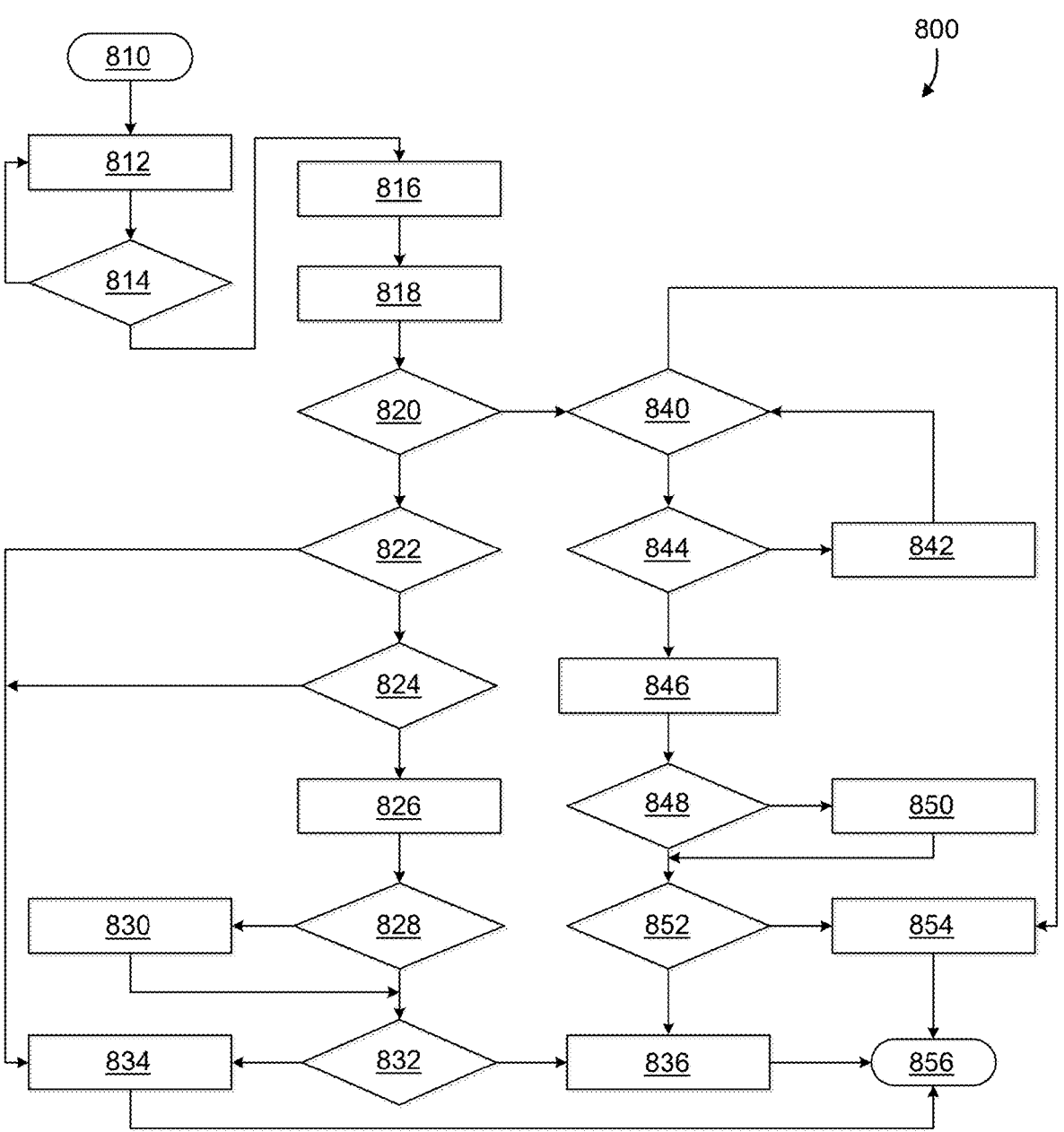
FIG. 8 is a flowchart illustrating an exemplary third method for landing site selection and path planning for an aircraft with the use of soaring weather that, in some examples, may be performed independently or in combination with the first and/or second methods of FIGS. 6 and 7, in accordance with an embodiment.

FIG. 8 is a flowchart illustrating another exemplary method 800 for landing site selection and path planning for an aircraft with the use of soaring weather conditions. The method 800 may start at 810.

At 812, the method 800 may include monitoring a status of an engine of the aircraft and a status of fuel stored onboard the aircraft. At 814, the method 800 may include determining whether a loss of engine thrust has been detected. If a loss of engine thrust has not been detected at 814, the method 800 may continue monitoring the engine and fuel status at 812. If a loss of engine thrust has been detected at 814, the method 800 may include determining the PGD at 816, and searching for a nearest airport at 818. Determining a nearest airport may consider the energy loss for maneuvers such as turns.

At 820, the method 800 may include determining whether the nearest airport is within the PGD. If the nearest airport is within the PGD at 820, the method 800 may include, at 822, determining whether the nearest airport is within the EDD. If the nearest airport is within the EDD at 822, the aircraft has sufficient energy to reach and land at the nearest airport. Therefore, the method 800 may include, at 834, generating and displaying a recommendation for the pilot to select the nearest airport and generate a direct-to-landing site flight path.

If the nearest airport is not within the EDD at 822, the method 800 may include, at 824, determining whether soaring weather conditions are near the link (i.e., direct path) of the airport and the aircraft within the EDD. In some examples, the method 800 does not consider soaring weather conditions located outside the EDD. In general, the farther away from the direct-to-landing site flight path, the more energy is wasted to fly to the soaring weather conditions. If there is no soaring weather conditions near the link, the method 800 may include generating and displaying a recommendation for the pilot to select the nearest airport and generate a direct-to-landing site flight path at 834. If there is soaring weather conditions sufficiently near the link, the method 800 may include, at 826, generating a soaring weather flight path that uses the soaring weather conditions near the link. At 828, the method 800 may include determining whether there is more than one flight path available with the soaring weather conditions. If there is more than one flight path available with the soaring weather conditions, the method 800 may include, at 830, comparing the distance of each of the available soaring weather flight paths, and selecting the one with the shortest distance to the airport. This allows the aircraft to land at the airport as quickly as possible while also reducing risk by using the soaring weather conditions.

Once the soaring weather flight path has been selected, either due to being the only available path (at 828) or due to being the shortest path (830), the method 800 may include, at 832, comparing the gap height of the soaring weather flight plan to the gap height of the direct-to-landing site flight plan. If the gap height of the soaring weather flight plan is less than the gap height of the direct-to-landing site flight plan, the soaring weather is not beneficial to use. Therefore, the method 800 may include generating and displaying a recommendation for the pilot to select the nearest airport and generate a direct-to-landing site flight path at 834. If the gap height of the soaring weather flight plan greater than or equal to the gap height of the direct-to-landing site flight plan, the method 800 may include, at 836, generating and displaying a recommendation for the pilot to select the nearest airport and generate a fly-by flight path that uses the soaring weather conditions.

If there are no airports within the PGD at 820, the method 800 may include, at 840, comparing the current altitude of the aircraft to the EDH. If the altitude is less than EDH at 840, the method 800 may include, at 854, generating and displaying a recommendation for the pilot to perform an off-airport emergency landing. If the altitude is greater than or equal to the EDH at 840, the method 800 may include, at 844, searching for available soaring weather conditions. In some examples, soaring weather conditions may be considered available for use if the PLH is greater than or equal to the absolute value of the gap height of the direct-to-landing site flight path, and the soaring weather conditions are within the EDD.

If there is no soaring weather conditions available at 844, the method 800 may include, at 842, selecting the next nearest airport and returning to 840 and comparing the current altitude of the aircraft to the EDH. Although the gap height of the direct-to-landing site flight path for the new airport is larger than the previously considered airport, the soaring weather conditions near the new airport may have stronger thermal, which may provide needed lift. If there is available soaring weather conditions available at 844, the method 800 may include, at 846, generating a new soaring weather flight path that uses the soaring weather conditions near the link.

At 848, the method 800 may include determining whether there is more than one flight path available with the soaring weather conditions. If there is more than one flight path available with the soaring weather conditions, the method 800 may include, at 850, comparing the gap height of each of the available soaring weather flight paths, and selecting the one with the largest gap height.

At 852, the method 800 may include determining whether the gap height of the selected soaring weather conditions is greater than or equal to zero. If the gap height of the selected soaring weather conditions is greater than or equal to zero at 852, the method 800 may include, at 836, generating and displaying a recommendation for the pilot to select the nearest airport and generate a fly-by flight path that uses the soaring weather conditions. If the gap height of the selected soaring weather conditions less than zero at 852, the method 800 may include, at 854, generating and displaying a recommendation for the pilot to perform an off-airport emergency landing.

The method 800 may end at 856.

The systems and methods disclosed herein provide various benefits over certain existing systems and methods. For example, the systems and methods disclosed herein provide for landing site selection and path planning in an unlikely, yet postulated, complete loss of engine thrust event in an aircraft during flight. The systems and methods may consider the use of soaring weather conditions to extend the flight of the aircraft and thereby promote safe landing of an aircraft in situations that may otherwise require off-airport emergency landings.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employy various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing aviation navigational information to a pilot of an aircraft during operation of the aircraft, comprising:

receiving, with one or more processors of a controller onboard the aircraft, data indicative of terrain, airports, airspace, aerodynamics of the aircraft, real-time weather, and real-time status of the aircraft;

determining, with the one or more processors of the controller, a gliding range of the aircraft based at least in part on soaring weather conditions capable of producing lift sufficient to extend the gliding range of the aircraft;

determining, with the one or more processors of the controller, a landing site for the aircraft based on the gliding range of the aircraft; and determining, with the one or more processors of the controller, a flight path of the aircraft that uses the soaring weather conditions to extend the gliding range of the aircraft and land at the landing site.

2. The method of claim 1, further comprising:

dynamically monitoring a status of the aircraft and environmental conditions to determine an updated gliding range of the aircraft; and adjusting the landing site to an updated landing site in response to a determination that the gliding range is insufficient to land at the previously planned landing site.

3. The method of claim 2, wherein the landing site is an airport or an off-airport landing site.

4. The method of claim 1, further comprising locking the landing site in response to the aircraft having an altitude that is below an emergency decision height (EDH) such that the landing site cannot be changed.

5. The method of claim 4, further comprising locking the landing site in response to the aircraft traveling a lateral distance in excess of an emergency decision distance (EDD), wherein the EDD is a maximum lateral distance that the aircraft can travel after a complete loss of thrust from an engine of the aircraft prior to descending from a current altitude to the EDH.

6. The method of claim 1, further comprising estimating a potential lift height (PLH) corresponding to an estimated altitude gain based on a maximum rate of lift and the soaring weather conditions.

7. The method of claim 1, wherein the landing site is within a processed glide distance representative of a maximum gliding range of the aircraft without the soaring weather conditions and with consideration of energy loss due to maneuvering the aircraft, the flight path is a first flight path of two or more flight paths that use the soaring weather conditions to extend the gliding range of the aircraft and land at the landing site, and the method includes selecting the first flight path from among the two or more flight paths due to the first flight path having a shortest distance to the landing site.

8. The method of claim 1, wherein the landing site is not within a processed glide distance representative of a maximum gliding range of the aircraft without the soaring weather conditions and with consideration of energy loss due to maneuvering the aircraft, the flight path is a first flight path of two or more flight paths that use the soaring weather conditions to extend the gliding range of the aircraft and land at the landing site, and the method includes selecting the first flight path from among the two or more flight paths due to the first flight path having a largest gap height.

9. The method of claim 1, further comprising:

determining an original glide distance representing a maximum gliding range of the aircraft without the soaring weather conditions and a processed glide distance representing the maximum gliding range of the aircraft without the soaring weather conditions and with consideration of energy loss due to maneuvering the aircraft; and displaying, on a display device onboard the aircraft, the original glide distance as a circle with an icon of the aircraft at the center of the circle, and the processed glide distance as an ellipse around the aircraft, wherein the original glide distance is a radius of the circle and the processed glide distance is the dimension from the icon of the aircraft to the circumference of the ellipse.

10. The method of claim 1, further comprising automatically determining the landing site and the flight path in response to detecting a complete loss of thrust from an engine of the aircraft.

11. A system for providing aviation navigational information to a pilot of an aircraft during flight of the aircraft, comprising:

one or more sources of data indicative of terrain, airports, airspace, aerodynamics of the aircraft, real-time weather, and a real-time status of the aircraft; and a controller onboard the aircraft in operable communication with the one or more sources, the controller configured to, with one or more processors:

receive the data from the one or more sources;

determine a gliding range of the aircraft based at least in part on soaring weather conditions capable of producing lift sufficient to extend the gliding range of the aircraft;

determine a landing site for the aircraft based on the gliding range of the aircraft; and determine a flight path of the aircraft that uses the soaring weather conditions to extend the gliding range of the aircraft and land at the landing site.

12. The system of claim 11, wherein the controller is configured to, with the one or more processors:

dynamically monitor a status of the aircraft and environmental conditions to determine an updated gliding range of the aircraft; and adjust the landing site to an updated landing site in response to a determination that the gliding range is insufficient to land at the previously planned landing site.

13. The system of claim 12, wherein the landing site is an airport or an off-airport landing site.

14. The system of claim 11, wherein the controller is configured to, with the one or more processors, lock the landing site in response to the aircraft having an altitude that is below an emergency decision height (EDH) such that the landing site cannot be changed.

15. The system of claim 14, wherein the controller is configured to, with the one or more processors, lock the landing site in response to the aircraft traveling a lateral distance in excess of an emergency decision distance (EDD), wherein the EDD is a maximum lateral distance that the aircraft can travel after a complete loss of thrust from an engine of the aircraft prior to descending from a current altitude to the EDH.

16. The system of claim 11, wherein the controller is configured to, with the one or more processors, estimate a potential lift height (PLH) corresponding to an estimated altitude gain based on a maximum rate of lift and the soaring weather conditions.

17. The system of claim 11, wherein the landing site is within a processed glide distance representative of a maximum gliding range of the aircraft without the soaring weather conditions and with consideration of energy loss due to maneuvering the aircraft, the flight path is a first flight path of two or more flight paths that use the soaring weather conditions to extend the gliding range of the aircraft and land at the landing site, and the controller is configured to, with the one or more processors, select the first flight path from among the two or more flight paths due to the first flight path having a shortest distance to the landing site.

18. The system of claim 11, wherein the landing site is not within a processed glide distance representative of a maximum gliding range of the aircraft without the soaring weather conditions and with consideration of energy loss due to maneuvering the aircraft, the flight path is a first flight path of two or more flight paths that use the soaring weather conditions to extend the gliding range of the aircraft and land at the landing site, and the controller is configured to, with the one or more processors, select the first flight path from among the two or more flight paths due to the first flight path having a largest gap height.

19. The system of claim 11, wherein the controller is configured to, with the one or more processors:

determine an original glide distance representing a maximum gliding range of the aircraft without the soaring weather conditions and a processed glide distance representing the maximum gliding range of the aircraft without the soaring weather conditions and with consideration of energy loss due to maneuvering the aircraft; and display, on a display device onboard the aircraft, the original glide distance as a circle with an icon of the aircraft at the center of the circle, and the processed glide distance as an ellipse around the aircraft, wherein the original glide distance is a radius of the circle and the processed glide distance is the dimension from the icon of the aircraft to the circumference of the ellipse.

20. The system of claim 11, wherein the controller is configured to, with the one or more processors, automatically determine the landing site and the flight path in response to detecting a complete loss of thrust from an engine of the aircraft.

* * * * *